May 1, 1951  C. W. J. HEDBERG  2,550,809
TRAVELING CARRIAGE ELECTRODE RAPPER
Filed Nov. 9, 1948  8 Sheets-Sheet 1

Inventor
Carl W. J. Hedberg
BY Stowell & Evans
ATTORNEYS

May 1, 1951 — C. W. J. HEDBERG — 2,550,809
TRAVELING CARRIAGE ELECTRODE RAPPER
Filed Nov. 9, 1948 — 8 Sheets-Sheet 4

Inventor
Carl W. J. Hedberg
By Stowell + Evans
ATTORNEYS

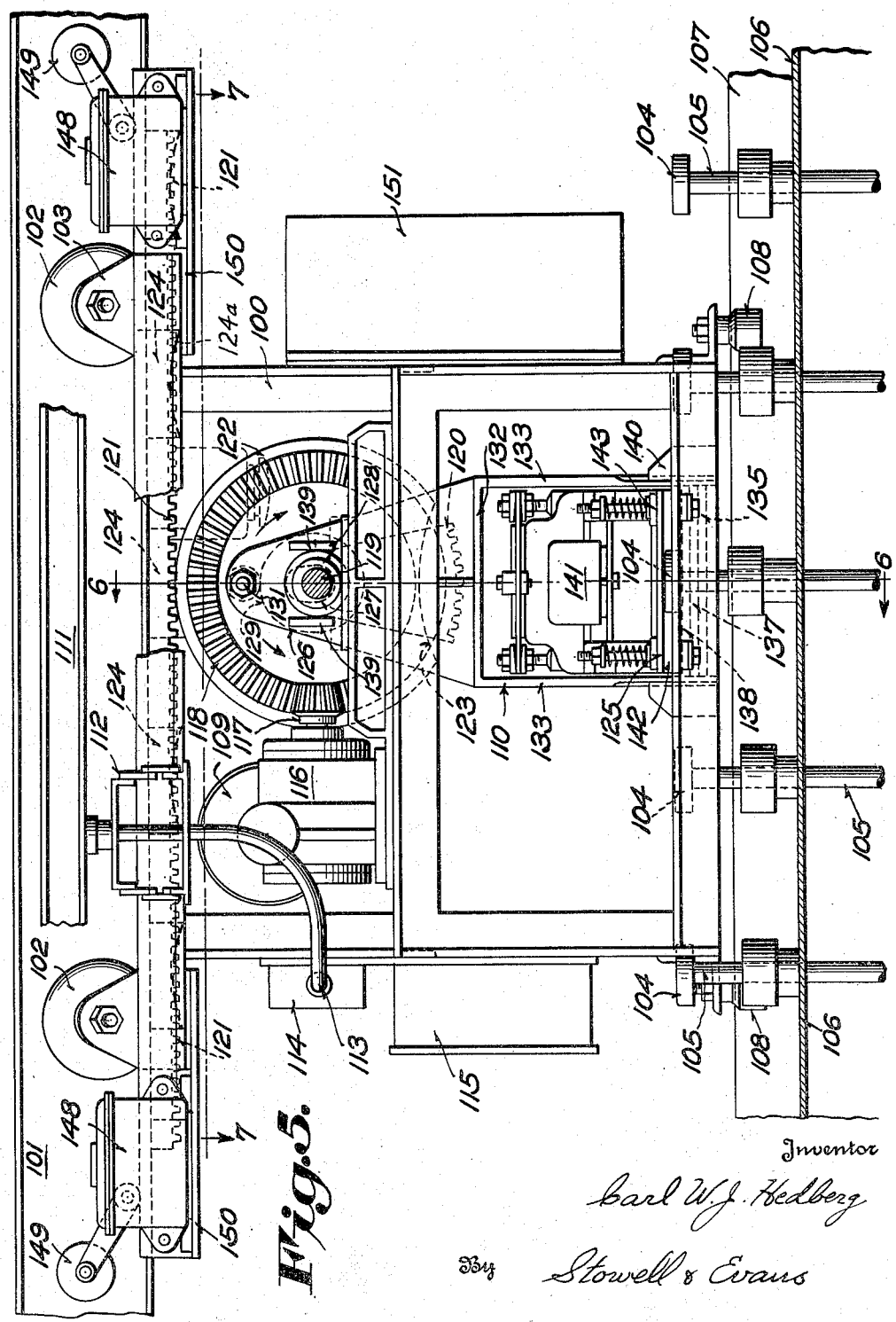

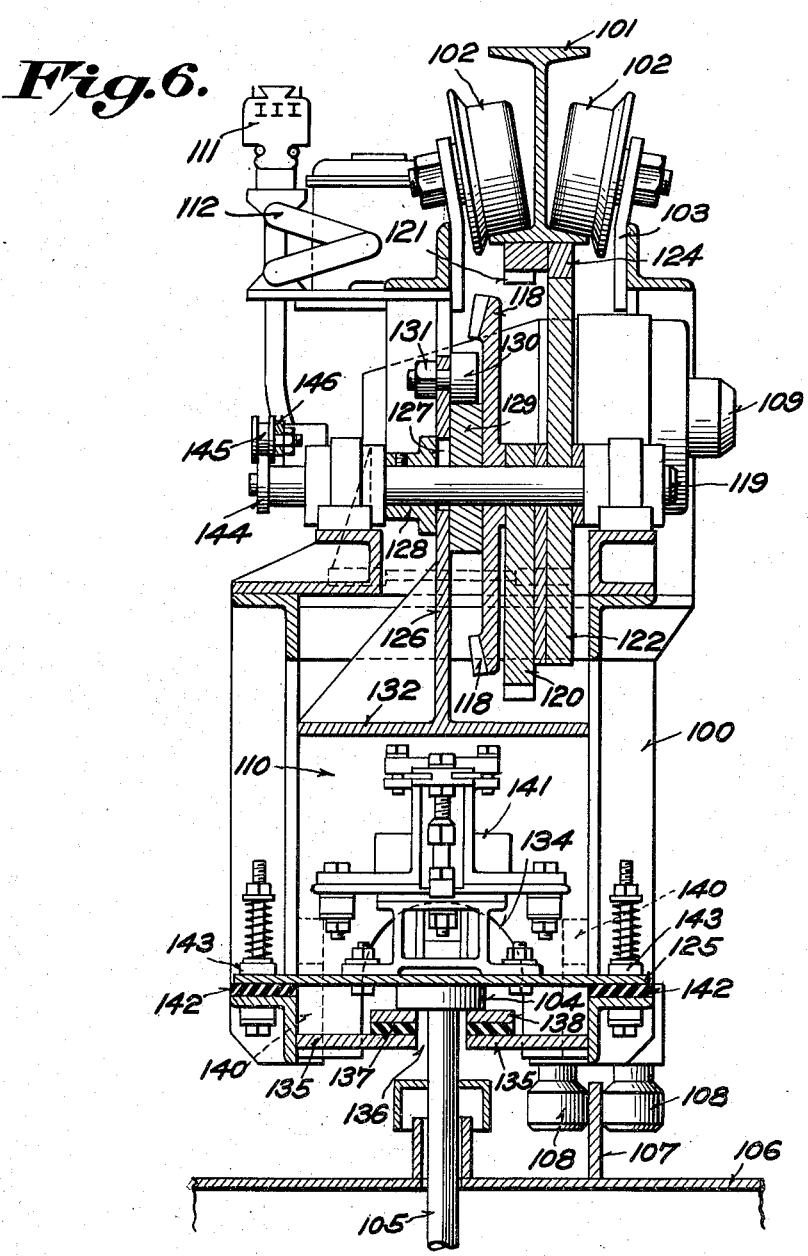

May 1, 1951
C. W. J. HEDBERG
2,550,809
TRAVELING CARRIAGE ELECTRODE RAPPER
Filed Nov. 9, 1948
8 Sheets-Sheet 7
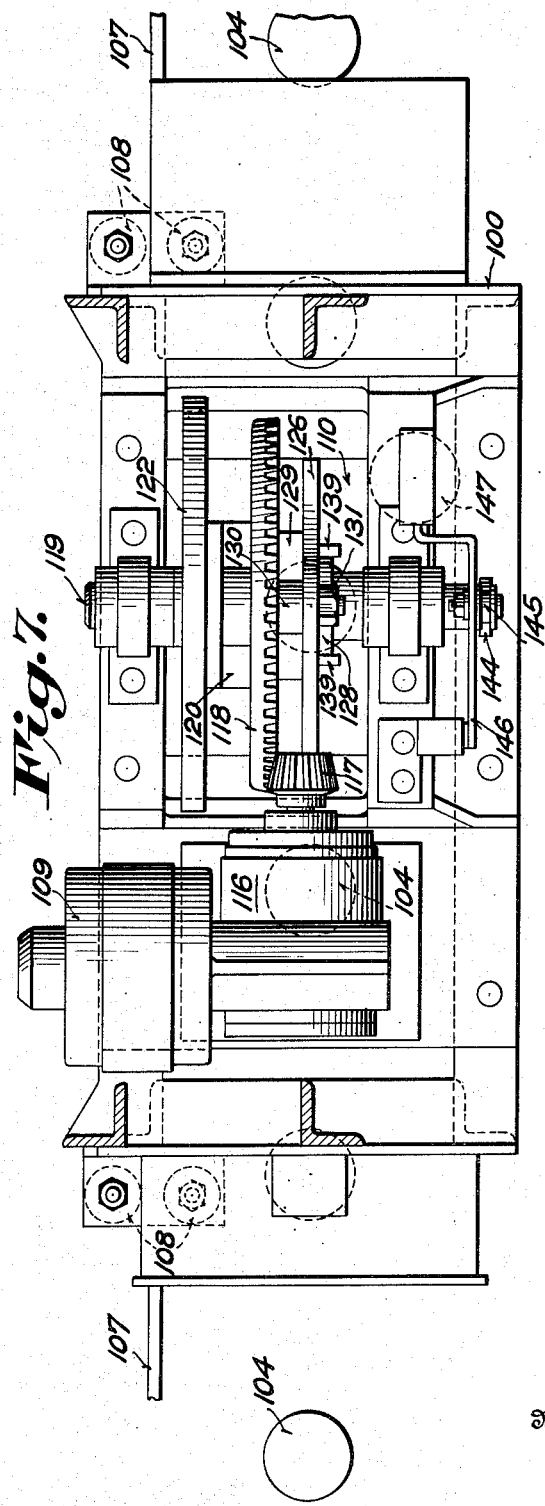
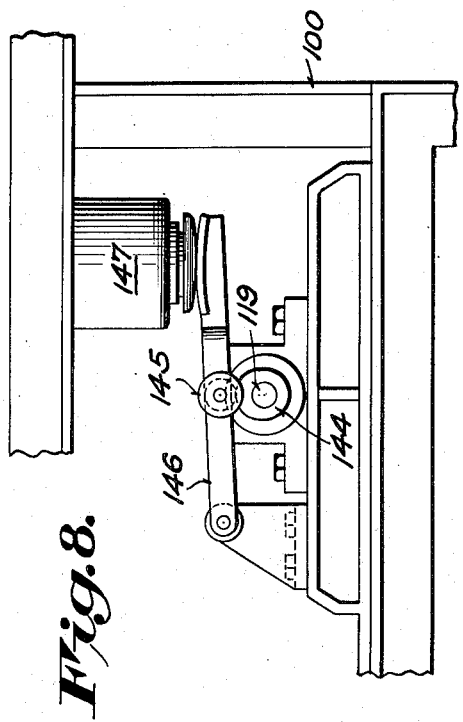
Inventor
Carl W. J. Hedberg
By Stowell + Evans
ATTORNEYS

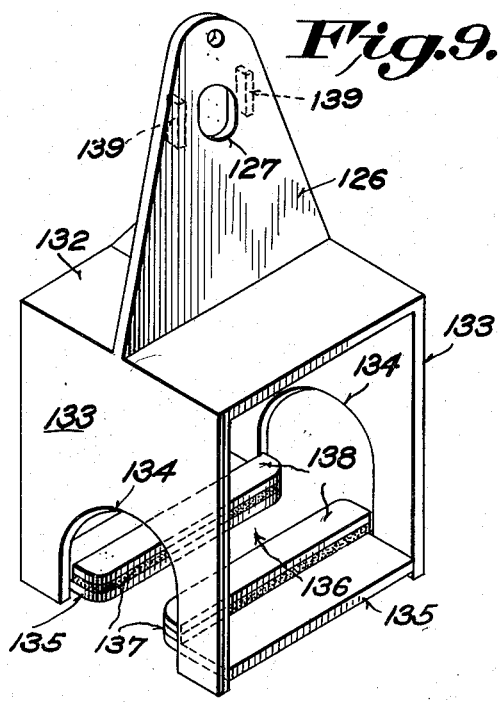
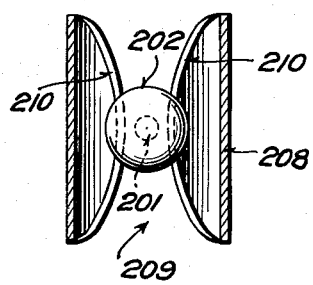
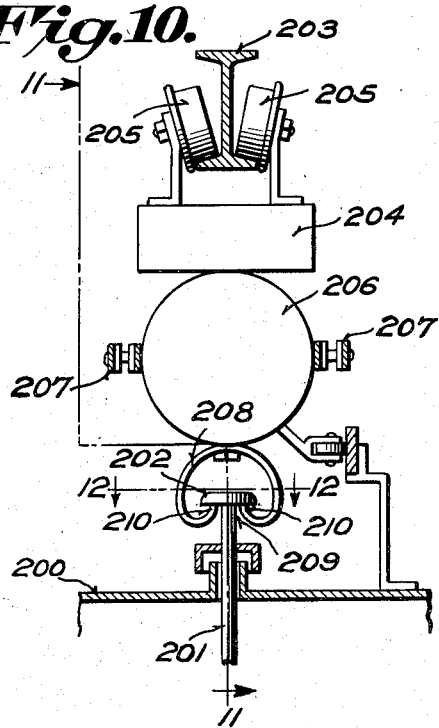
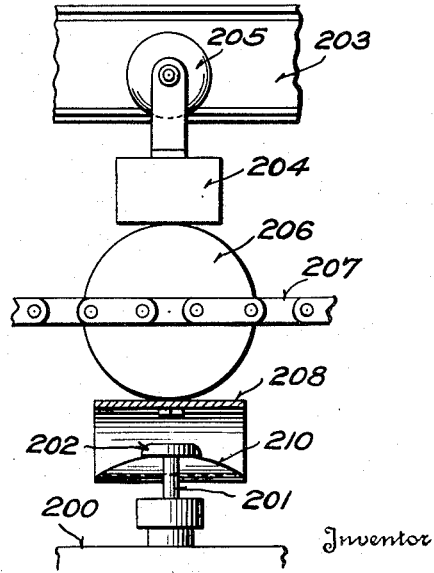

Patented May 1, 1951

2,550,809

UNITED STATES PATENT OFFICE 2,550,809

TRAVELING CARRIAGE ELECTRODE RAPPER

Carl W. J. Hedberg, Bound Brook, N. J., assignor to Research Corporation, New York, N. Y., a corporation of New York Application November 9, 1948, Serial No. 59,095

10 Claims. (Cl. 183—7)

This invention relates to apparatus for rapping the electrodes of an electrical percipitator to dislodge dust that accumulates thereon during operation of the precipitator. Unless the accumulated dust is removed from time to time, the deposits thereof increase to an extent impairing the efficiency of operation of the precipitator. More particularly the invention relates to an electrode rapper that is mounted on a carriage for translation between a plurality of electrode rapping stations.

An object of the invention is to provide an electrode rapper that is mounted on a carriage that travels on a track preferably disposed exteriorly of the precipitator housing for ready accessibility for repair and maintenance. The rapper mechanism is automatically controlled and economically and efficiently functions to rap electrodes with a minimum of supervision by operating personnel.

Another object is to provide a traveling carriage electrode rapper that cooperates with vibration transmitting extensions of the electrodes in a manner to efficiently communicate vibrations from the rapper to the electrodes. The rapper of the invention is adapted to rap the electrodes one after another or in successive small groups and, therefore, power requirements for the rapping are substantially less than in precipitating systems wherein all electrodes are rapped simultaneously.

The invention is typically embodied in an electrical precipitator having a housing and a plurality of complementary discharge and extended surface electrodes in the housing, and includes a plurality of vibration transmitting members extending from at least some of the electrodes through a wall of the housing and terminating in aligned anvil members located exteriorly of the housing, a track disposed in parallel relationship to the line of the anvil members, a carriage riding on the track, a vibrator mounted on the carriage, power means translating the carriage along the track, and means urging the vibrator into successive engagement with the anvil members with a substantial pressure component transverse to the direction of travel of the carriage.

In an exemplary device, the traveling carriage has a shoe, means mounting the shoe on the carriage to successively and yieldingly engage the anvil members with a substantial pressure component transverse to the direction of travel of the carriage and means for vibrating the shoe.

In another form, power driven means is provided for translating the carriage stepwise along the line of anvil members from one anvil station to the next and for creating a hiatus in the movement of the carriage at each anvil station, and power driven means mounted on the carriage for engaging the anvil members, lifting the anvil members into vibration transmitting engagement with the vibrator, lowering the anvil members, and releasing the anvil members during the hiatus in carriage movement at each anvil station.

In yet another form, the carriage travels continuously along the line of anvil members and has a vibrating cam device that successively engages the anvil members, raises them into sliding vibration transmitting engagement, and releases them as the carriage moves on.

The several embodiments of the invention, shown and described herein by way of illustration, variously accomplish the aims and objects of the invention as referred to hereinbefore and as may appear in the following detailed description taken in connection with the accompanying drawings wherein:

Figure 5 is an elevational view of another form of electrode rapping device;

Figure 6 is a transverse sectional view of the device taken along line 6—6 of Figure 5;

Figure 7 is a horizontal sectional view thereof taken on line 7—7 of Figure 5;

Figure 8 is an enlarged detail view of one of the switches of the mechanism of Figures 5-7;

Figure 9 is a perspective view of the stirrup of the rapper of Figures 5-8;

Figure 10 is an end view of yet another form of electrode rapper in accordance with the invention;

Figure 11 is a view taken along the line 11 of Figure 10; and

Figure 12 is a horizontal sectional view taken along the line 12—12 of Figure 11.

Figure 1:
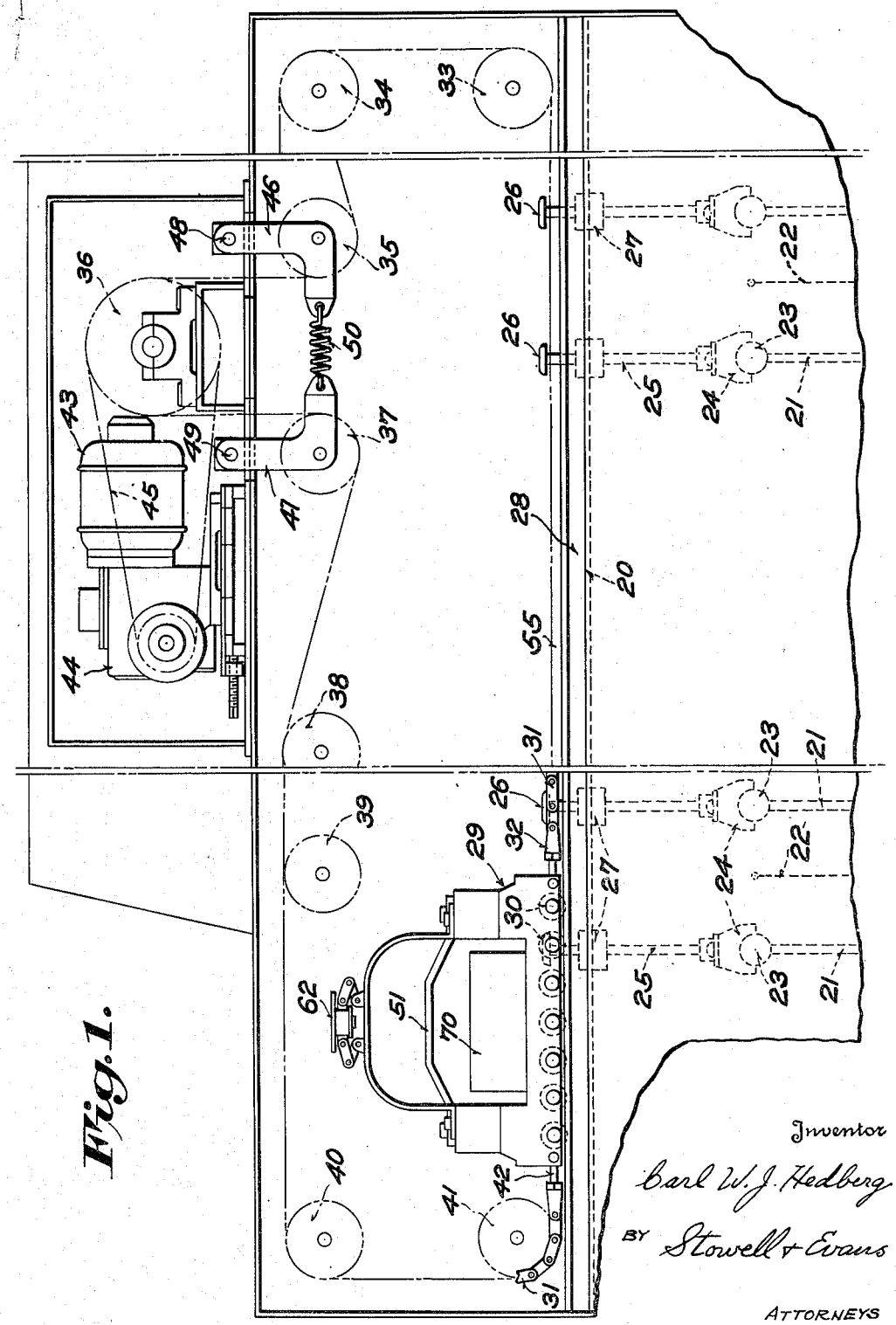
Figure 1 is a vertical sectional view of one form of the electrode rapping mechanism of the invention shown in association with an electrical precipitator.

Referring to the drawings, particularly to Figures 1-4 thereof, the electrode rapping mechanism is shown as being positioned on the top of an electrical precipitator including a housing 20 in which are mounted extended surface collecting electrodes in the form of plates 21 and complementary discharge electrodes in the form of wires 22, as is conventional. The plate hangers 23 are provided with brackets 24 from which vibration transmitting rods 25 extend vertically upward through the top of the housing 20 and terminate in anvil members 26 located outside the housing. The rods pass through bushings 27 mounted in the top of the housing. Rods 25 and anvils 26 are arranged rectilinearly and a track is laid on top of the precipitator housing, the track having rails 28 extending parallel to and on either side of the line of the anvil members 26.

On the track is a carriage 29 riding on wheels 30 engaging the rails, whereby the carriage may roll along the track successively over the anvils 26.

The carriage is pulled back and forth over the anvils by parallel chains 31 anchored to one end 32 of the carriage and threaded around the idler wheels 33, 34 and 35, over the driving sprockets 36, and thence around the idlers 37, 38, 39, 40 and 41 to the other end of the carriage where they are anchored at 42. The driving sprocket 36 is driven by the motor 43 through a reduction gear 44 and a belt or chain drive 45. The idlers 35 and 37 are mounted in brackets 46 and 47 pivoted at 48 and 49 and urged towards each other by a spring 50, whereby uniform tension is maintained in the carriage traversing chains 31.

Figure 3:
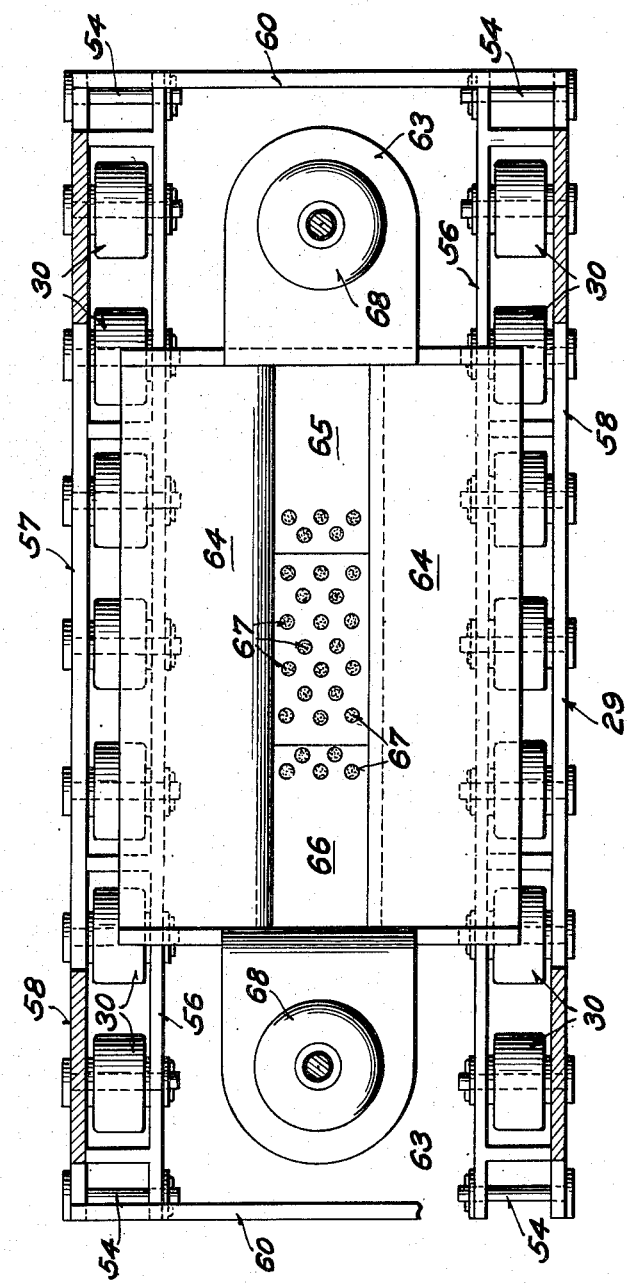
Figure 3 is sectional view of the carriage taken along the line 3—3 of Figure 2.
Figure 4:
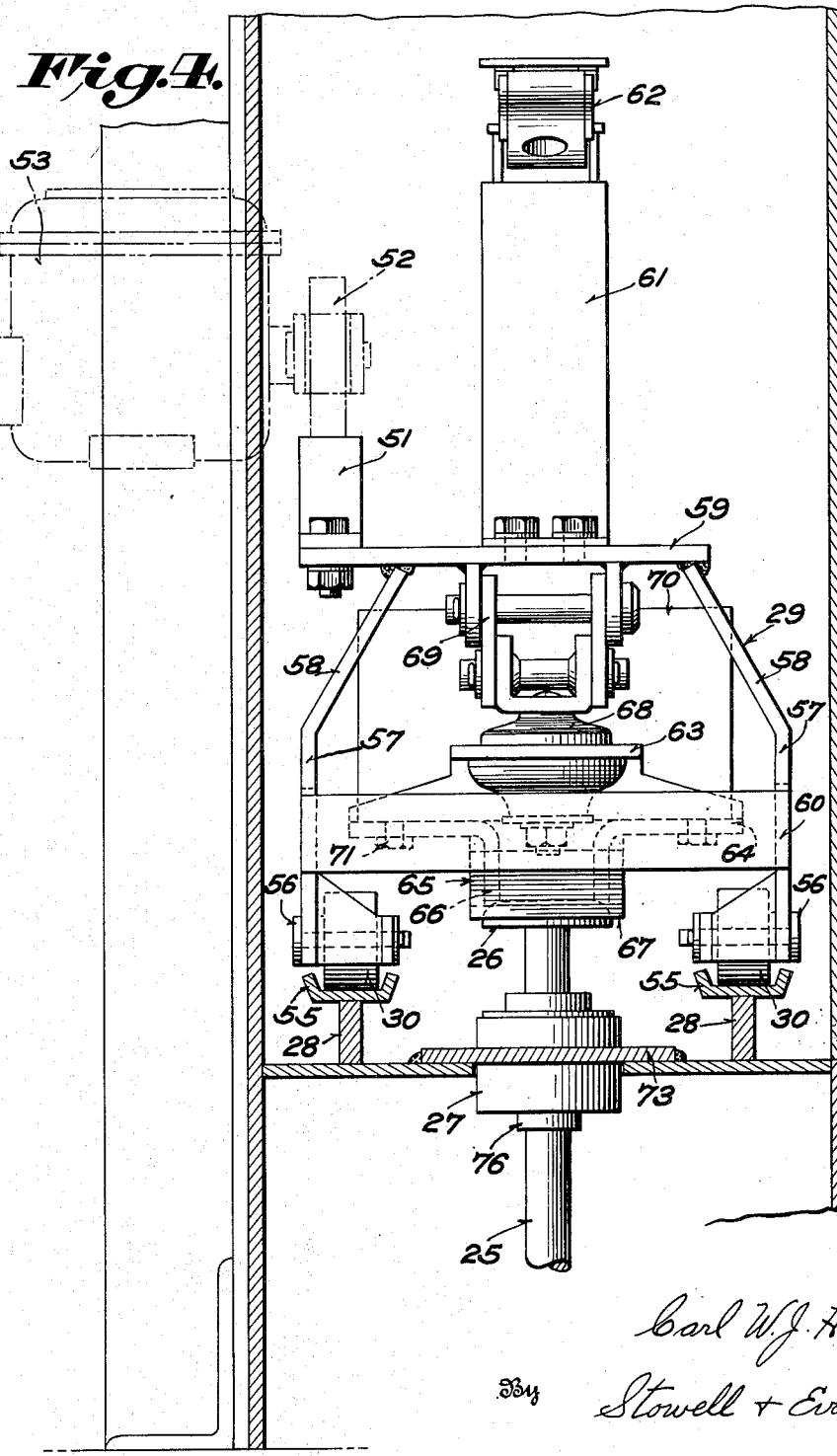
Figure 4 is an end view of the rapper shown in the previous figures.

As seen in Figure 3, the translating chains 31 may be anchored to the carriage 29 by means of pins 54. As seen in Figure 4, the lower runs of the chains may slide in the grooved portions 55 of the tracks 28 in which the carriage wheels 30 also ride.

The carriage 29 has a longitudinally extending arched bar 51 that engages the roller 52 of a limit switch 53 located adjacent one end of the track and connected to the traversing motor 43 to stop and reverse the motor when the carriage reaches this end of the track. A similar limit switch is located at the other end of the track and similarly serves to stop and reverse the direction of travel of the carriage at this point. Thus, the carriage is translated from one end of the track to the other in a continuous manner and its direction of travel is automatically reversed at the ends of the track.

Figure 2:
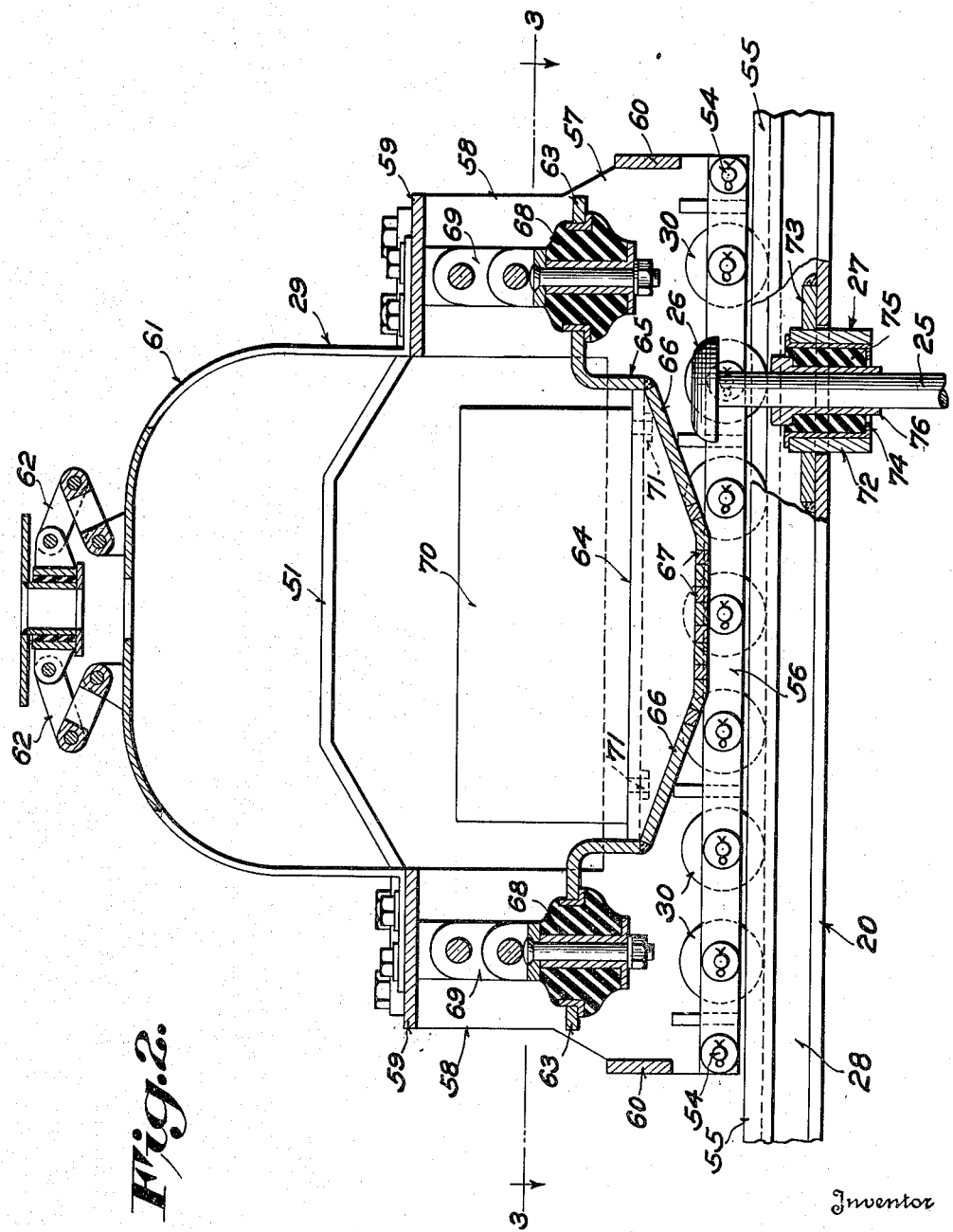
Figure 2 is an enlarged vertical sectional view of the traveling carriage and associated parts of the mechanism of Figure 1.

The structure of the carriage 29 is shown in detail in Figures 2, 3 and 4. Referring to these figures, the carriage has a frame including the longitudinal members 56 providing channels in which the wheels 30 are mounted, side plates 57 having four upstanding legs 58, opposed pairs of which are bent inwardly towards each other, and top plates 59 welded to the tops of the legs. End strips 60 extend transversely between the side plates 57 to complete the carriage frame.

The top plates 59 of the frame carry the arched bar 51 for activating the limit switches and a bowed member 61 extending thereabove and on which is mounted the trolley 62 through which current is picked up from a rail or wire, not shown, to operate the vibrator to be described in greater detail hereinafter.

Suspended from the top plates 59 of the frame is a vibrator cradle having arms 63 supporting a generally horizontal platform 64 from which depends a shoe 65 having downwardly and inwardly sloping faces 66 and a flat bottom 67. The cradle arms 63 are mounted on rubber blocks 68 that are suspended on links 69 pivoted to the mounting blocks and to the frame top plates 59 to permit the cradle to swing to a limited degree in the direction of travel of the carriage.

A vibrator 70 is supported on the cradle and fastened thereto by bolts 71. The vibrator may be of any suitable type but preferably is an electromechanical vibrator such as a "Syntron" vibrator that operates continuously for long periods of time. Current for operating the vibrator is collected by the trolley 62 and conducted to the vibrator through conventional wiring. Preferably, the plane of vibration of the vibrator is vertical and parallel to the direction of travel of the carriage, although other planes or lines of vibration may be employed without departing from the invention.

As best seen in Figures 2 and 4, the bottom face 67 of the cradle shoe 65 hangs somewhat below the level of the tops of the anvils 26 and the inclined faces 66 of the shoe are disposed to engage the anvils as the carriage travels along the track. When one of the shoe faces 66 contacts an anvil, the inclined face of the shoe rides up the anvil and the cradle is rocked rearwardly and upwardly until the bottom face of the shoe rides on and over the top of the anvil. Thus, substantially the full weight of the cradle and vibrator is impressed on the anvil and vibrations produced by the vibrator are transferred through the cradle and shoe to the anvil. Since the carriage travels at a relatively slow rate, the vibrations are applied to the anvil for a substantial period of time which can be varied by changing the rate of translation of the carriage. As the carriage passes over an anvil, the cradle drops to its lowermost position of suspension and remains there until the next successive anvil is contacted. This action occurs in either direction of travel of the carriage owing to the symmetrical construction and suspension of the vibrator cradle.

The vibration transmitting rods 25 pass through the bushings 27 that include an outer sleeve 72 carried in the mounting flange 73 that is welded, as shown, to the top 20 of the precipitator. Nested within the sleeve is a flanged cup 74 containing a tubular rubber insert 75 holding a metallic sleeve 76 through which the rods 25 slide. The bushing provides a relatively tight gas seal for the rod 25 yet does not restrain vibration of the rod.

In operation, the vibrator carriage is traversed back and forth over the track 28 by the mechanism previously described with reference to Figure 1. The vibrating shoe of the cradle successively rides over the anvils 26 and, during its period of contact therewith, transmits vibrations through the rods 25 to the electrodes 21 of the precipitator to shake accumulated precipitated material therefrom.

Turning now to the form of traveling carriage electrode rapper shown in Figures 5 through 9, the mechanism shown includes a carriage 100 that is suspended from an overhead I-beam or mono-rail track 101 by wheels 102 rotatably mounted on wheel brackets 103 attached to the carriage. The mono-rail track 101 runs parallel to the line of anvils 104 forming mushroom shaped heads for the vibration transmitting rods 105 that are attached to the electrodes of an electrical precipitator similar to the precipitator described in connection with Figures 1 through 4. Reference numeral 106 identifies the roof or top of the precipitator on which is mounted a guide rail 107 that extends parallel to the mono-rail track 101. Guide rollers 108 mounted on the carriage embrace the guide rail 107 and prevent the bottom of the carriage from swinging sideways.

On the carriage is mounted a motor 109 that provides power for translating the carriage and for raising and lowering the stirrup 110. Current for energizing the motor is collected from the power supply rail 111 through trolley 112 and conducted through cable 113 to terminal box 114 and thence through motor control box 115 to the motor, as is conventional.

Motor 109 drives through reduction gear 116 to a bevel pinion 117 meshing with the ring gear 118 carried by shaft 119 journalled in bearings mounted on the carriage 100. The shaft 119 carries a gear segment 120 that subtends an arc of about 50° and meshes periodically with the rack 121 that extends along the underside of the mono-rail track 101. With shaft 119 rotating, when the gear segment is in mesh with the rack, the carriage is moved along the track and when the gear segment is disengaged from the rack, the carriage stops.

Shaft 119 also carries a locking wheel 122 having a crescent shaped segment removed from the periphery thereof to provide a peripheral depression 123 extending along an arc of about 65° and in radial alignment with the gear segment 120. Mounted on the under side of the track 101, on centers corresponding to the spacing of the vibration transmitting rods 105, are locking shoes 124. These locking shoes lie in the plane of the locking wheel 122 and have arcuate bottom faces 124a that are slidingly engaged by the periphery of the locking wheel along its circular portion. However, when the crescent shaped depression 123 of the locking wheel reaches one of the locking shoes 124, the carriage is unlocked and is free to move along the mono-rail track 101 which occurs, as described hereinbefore, as the gear segment 120 engages the rack 121. When the carriage arrives at the next locking shoe, the gear segment is disengaged from the rack and the circular arc of the locking wheel 122 engages the locking shoe to restrain the carriage from movement along the track. In operation, the motor 109 preferably runs continuously and the carriage moves from station to station in a stepwise manner, stopping at each station for a substantial period of time.

The stirrup 110, previously mentioned, has the function of raising the anvil members 104 and the vibration transmitting rods 105 into engagement with the vibrator plate 125, holding the anvil members there for a period of time, and thereafter lowering the anvil members to rest position. This action occurs during the hiatus in travel of the carriage at the rapping stations.

The stirrup 110 has a vertically extending suspension plate 126 provided with a vertically elongated hole 127 through which the shaft 119 extends. The suspension plate is included between a collar 128 on the shaft and a stirrup lifting cam 129 fixed to the shaft 119 for rotation therewith. A cam follower in the form of a roller 130 is mounted on the suspension plate 126 near the top thereof and is held in place by a nut 131. The follower rides on the lifting cam 129, and, from an inspection of Figure 5, it will be seen that the rise of the cam is diametrically opposed to the gear segment 120 whereby when the carriage is at the mid-point of its rest cycle, as shown in this figure, the cam has raised the stirrup suspension plate to its highest point. It will be understood that the slot 127 in the suspension plate permits the latter to rise and fall as activated by the cam 129.

As best seen in Figure 9, the stirrup includes a horizontal top plate 132, welded or otherwise suitably secured to the bottom of the suspension plate, a pair of end plates 133 having aligned arched openings 134, and a pair of horizontal, longitudinally extending bottom plates 135 that bridge the gap between the end plates 133. The bottom plates 135 are spaced apart to provide a longitudinal slot 136 therebetween. Rubber pads 137 are secured to the bottom plates 135 along the sides of slot 136 and wear plates 138 of metal overlie the rubber pads. A pair of guides 139 are carried by the suspension plate 126 and, in assembly, the guides straddle the shaft collar 128 to align the hole 127 with the shaft 119.

It will be seen that, as the carriage moves between stations, the stirrup is in its lowest position and the wear plates 138 of the stirrup are below the level of the bottoms of the anvils 104 so that the stirrup is free to leave one anvil and travel to the next without being retarded by the anvils. Slot 136 accommodates the vibration transmitting rods 105 and the wear plates 138 move under the heads of the mushroom shaped anvils. When the carriage comes to rest at a rapping station, the cam 129 raises the stirrup and brings the anvil into vibration transmitting contact with the vibrator plate 125. Guides 140 mounted on the carriage frame sliding engage the end plates 133 of the stirrup to restrain swinging movement thereof.

A vibrator 141 which may be of the Syntron type, is bolted to the vibrator plate 125 and causes the latter to vibrate. The vibrator plate is mounted on resilient support pads 142 on the carriage frame and is urged downwardly by a spring-pressed device 143. When one of the anvil members is raised into contact with the bottom of the vibrator plate 125, the latter is lifted off the support pads 142 and the full weight of the plate and the vibrator plus the force of the spring-pressed device is applied to the anvil.

Although the vibrator may operate continuously, it has been found advantageous to energize the vibrator substantially only while an anvil is in contact with the vibrator plate 125. To this end, and as shown in Figure 8, the shaft 119 is provided with a cam 144 that raises the roller 145 carried by lever 146 to cause the lever to close the switch 147 during the period when an anvil is in rapping relation to the vibrator plate 125. It will be understood that the current for energizing the vibrator is picked up from the power supply rail 111 and conducted through the switch 147 to the vibrator by conventional wiring.

It is desirable to provide for automatic reversal of travel of the carriage at each end of the track. For this purpose, limit switches 148 having operating levers 149 are mounted on the carriage frame extensions 150 and pins (not shown) are positioned at each end of the track to engage the operating levers of the limit switches and, through the motor control box 115, to reverse the motor 109 at preselected limits of travel of the carriage.

Although the operation of the traveling carriage electrode rapper illustrated in Figures 5 through 9 is believed to be clear from the foregoing description, it will now be reviewed briefly with reference to Figure 5. Referring to this figure, the apparatus is shown in the position occupied when the rest cycle at a rapping station is half completed. The stirrup is in fully raised position, an anvil 104 is pressed against the vibrator plate 125 and the vibrator is operating. Assuming that the ring gear 118 is turning clockwise, the vibrator continues to operate until a short time after stirrup cam 129 is rotated to lower the stirrup to a point where the anvil 104 drops out of contact with the vibrator plate 125; at this time the vibrator switch operating cam 144 (Figure 8) allows the vibrator switch to open and the vibrator is deenergized. Shaft 119 rotates until the unlocking depression 123 in the locking wheel 122 clears the locking shoe 124. At this point, the stirrup is at its lowermost position and is hanging free of the anvil 104 which has been lowered to rest position. The gear segment 120 now meshes with the rack 121 on the underside of the monorail track 101 and the carriage is propelled to the left as seen in Figure 5. At the next rapping station, the gear segment 120 moves out of mesh with the traversing rack 121 and the circular locking portion of the locking wheel 122 slides into engagement with the locking shoe 124. As the shaft continues its rotation, the stirrup cam 129 raises the stirrup 110 and the anvil 104 under which the wear plates of the stirrup have passed. Just before the top of the anvil is brought into engagement with the vibrator plate 125, the vibrator switch activating cam 144 (Figure 8) operates to close the switch and energize the vibrator 141. Immediately thereafter, the stirrup raises the anvil into contact with the vibrator plate and holds it there through the starting position shown in Figure 5.

This cycle is repeated, the carriage progressing along the line of anvils until the left hand limit switch 148 is activated to reverse the motor and the direction of travel of the carriage. A similar reversal of carriage direction occurs at the other end of the line.

Yet another form of traveling carriage electrode rapper is shown in Figures 10 through 12. In these figures, 200 represents the roof of an electrical precipitator through which extend vibration transmitting rods 201 having anvil members 202, the lower end of the rods 201 being attached to electrodes to be rapped. A track in the form of an I-beam 203 extends over and parallel to the line of anvil members. A carriage 204 travels along the track on wheels 205 and from the carriage a vibrator 206 is suspended by a vibration insulating mounting. Parallel chains 207 serve to translate the carriage and vibrator along the track.

Suspended from the vibrator is a vibrating shoe 208 having a longitudinal slot 209 in the bottom that allows the shoe to straddle the rods 201. As best seen in Figure 11, the edges of the shoe defining the slot 209 are turned upwardly and are bowed upwardly and inwardly from the ends of the slot to provide cam surfaces 210. When the carriage is moved along the line of anvil members, the under surfaces of the anvils are engaged by the cam surfaces 210 and the anvil members 202, rods 201 and electrodes to which the rods are attached are raised and suspended from the vibrating shoe. Vibrations are thus transmitted from the shoe to the electrodes during the time when the anvil members are suspended by the shoe 208.

From the foregoing description, it will be seen that the present invention provides a traveling carriage electrode rappper that may be mounted outside of the housing of an electrical precipitator where it is readily accessible for repair and maintenance. In case major repairs are needed, the entire traveling carriage may be removed and quickly replaced by one in good repair; thereafter, the defective carriage may be serviced at leisure thus minimizing or eliminating the necessity for shutting down the precipitator.

The traveling carriage electrode rapper of the invention includes a mechanism for urging the vibrator and a plurality of aligned anvil members into successive engagement with a substantial pressure component transverse to the direction of travel of the carriage. The vibrator is resiliently suspended on the traveling carriage to minimize undesired transfer of energy to the carriage and it may be so mounted on the carriage that substantially the entire weight of the vibrator and cradle is transferred from the carriage to the anvil during the rapping operation. The downward thrust of the vibrator against the anvil may be augmented by spring pressure if desired. Also, the force urging the vibrator and the anvil member into engagement may be applied in whole or in part by the weight of the parts depending from the anvil member.

I claim:

1. In an electrical precipitator including a housing and a plurality of complementary discharge and extended surface electrodes in said housing, a plurality of vibration transmitting members extending from said electrodes through a wall of said housing and terminating in aligned anvil members located exteriorly of said housing, a track disposed in parallel relationship to the line of said anvil members, a carriage riding on said track, a vibrator mounted on said carriage, power means translating said carriage along said track, and means urging said vibrator into successive engagement with said anvil members with a substantial pressure component transverse to the direction of travel of the carriage.

2. In an electrical precipitator including a housing, a plurality of complementary discharge and extended surface electrodes in said housing, means for energizing said electrodes and means for passing gas to be cleaned between said complementary electrodes, a plurality of vibration transmitting members extending from said electrodes through a wall of said housing and terminating in aligned anvil members located exteriorly of said housing, a track disposed in parallel relationship to the line of said anvil members, a carriage riding on said track, a shoe, means mounting said shoe on said carriage to successively and yieldingly engage said anvil members with a substantial pressure component transverse to the direction of travel of said carriage, means for vibrating said shoe, and power means for moving said carriage along said track.

3. In an electrical precipitator including a housing, a plurality of complementary discharge and extended surface electrodes in said housing, means for energizing said electrodes and means for passing gas to be cleaned between said complementary electrodes, a plurality of vibration transmitting members extending from said electrodes through a wall of said housing and terminating in aligned anvil members located exteriorly of said housing, a track disposed in parallel relationship to the line of said anvil members, a carriage riding on said track, a vibrator mounted on said carriage, power driven means for translating said carriage stepwise along said line of anvil members from one anvil station to the next and for creating a hiatus in the movement of said carriage at each anvil station, and power driven means mounted on said carriage for engaging said anvil members, lifting said anvil members into vibration transmitting engagement with said vibrator, lowering said anvil members, and releasing said anvil members during the hiatus in carriage movement at each anvil station.

4. In an electrical precipitator including a housing, a plurality of complementary discharge and extended surface electrodes in said housing, means for energizing said electrodes and means for passing gas to be cleaned between said complementary electrodes, a plurality of vibration transmitting members extending from said electrodes through a wall of said housing and terminating in aligned anvil members located exteriorly of said housing, a track disposed in parallel relationship to the line of said anvil members, a carriage riding on said track, a vibrator mounted on said carriage, a shoe mounted on said vibrator and connected to be vibrated by said vibrator, said shoe having a cam surface so positioned with respect to said anvil members that said anvil members are raised by said cam, supported thereon and returned to rest position as said carriage is moved along said track and power means for translating said carriage along said track.

5. A traveling carriage electrode rapper comprising carriage means, a cradle, link means pivotally suspending said cradle from said carriage means for limited rocking movement in the direction of travel of said carriage means, said cradle having an integral shoe providing inclined ramps at each end thereof whereby said shoe may ride successively over a series of aligned anvil members positioned in the path of travel of said carriage means, and a vibrator carried by said cradle in vibration transmitting relation to said shoe.

6. A traveling carriage electrode rapper comprising carriage means, a stirrup mounted on said carriage means, said stirrup having a longitudinal slot bounded by adjacent horizontal members positioned to engage the under surfaces of a series of aligned mushroom-shaped anvil members positioned in the path of travel of said carriage means, means for raising and lowering said stirrup and an anvil member engaged thereby, and a vibrator mounted on said carriage means and positioned to be engaged by an anvil member supported in said stirrup as said stirrup is raised to an elevated position.

7. A traveling carriage electrode rapper comprising carriage means, a vibrator resiliently supported on said carriage, and a stirrup member mounted on a vibrating element of said vibrator, said stirrup having a longitudinal slot bounded by cam members formed to engage the under-surfaces of a series of aligned mushroom-shaped anvil members positioned in the path of travel of said carriage means and to raise and lower said anvil means as said carriage is moved along its path of travel.

8. In an electrical precipitator including a housing and a plurality of complementary discharge and extended surface electrodes in said housing, vibration transmitting members extending from said electrodes and terminating in aligned ends exterior of said housing, a track disposed in parallel relation to the line of said vibration transmitting member ends, a carriage riding on said track, a vibrator carried by said carriage, power means translating said carriage along said track, and means urging said vibrator into successive contact with the ends of said vibration transmitting members with a pressure sufficient to maintain substantial contact between said vibrator and the ends of said vibration transmitting members.

9. In an electrical precipitator including a housing and a plurality of complementary discharge and extended surface electrodes in said housing, individual vibration transmitting members extending from each of said extended surface electrodes and terminating in aligned ends exterior of said housing, a track disposed in parallel relation to the line of said vibration transmitting member ends, a carriage riding on said track, a vibrator carried by said carriage, power means translating said carriage along said track, and means urging said vibrator into successive contact with the ends of said vibration transmitting members with a pressure sufficient to maintain substantial contact between said vibrator and the ends of said vibration transmitting members.

10. In an electrical precipitator including a housing and a plurality of complementary discharge and extended surface electrodes in said housing, a plurality of vibration transmitting members extending from said electrodes through a wall of said housing and terminating in aligned anvil members located exteriorly of said housing, a track disposed in parallel relationship to the line of said anvil members, a carriage riding on said track, a shoe yieldingly suspended on said carriage to successively engage and ride over said anvil members with a substantial pressure component therebetween, means for vibrating said shoe, and power means for moving said carriage along said track.

CARL W. J. HEDBERG.

REFERENCES CITED

The following references are of record in the file of this patent:

UNITED STATES PATENTS

| Number | Name | Date |
| --- | --- | --- |
| 1,760,461 | Weyandt | May 27, 1930 |

FOREIGN PATENTS

| Number | Country | Date |
| --- | --- | --- |
| 316,071 | Great Britain | July 25, 1929 |
| 501,720 | Germany | Aug. 15, 1930 |
| 514,587 | Germany | Dec. 13, 1930 |
| 369,255 | Great Britain | Mar. 17, 1932 |